United States Patent

Ringle

[11] Patent Number: 5,996,201
[45] Date of Patent: Dec. 7, 1999

[54] VALVE ASSEMBLY TOOL

[76] Inventor: Gerald D. Ringle, 3025 West U.S. 12, Michigan City, Ind. 46360

[21] Appl. No.: 09/016,167

[22] Filed: Jan. 30, 1998

[51] Int. Cl.[6] .................................................... B23P 19/04
[52] U.S. Cl. ........................................................... 29/213.1
[58] Field of Search ............................. 269/37, 303, 304, 269/305, 910, 99, 236, 234, 307; 29/203, 204, 281.3

[56] References Cited

U.S. PATENT DOCUMENTS

| | | |
|---|---|---|
| 2,434,456 | 1/1948 | Cook . |
| 3,138,855 | 6/1964 | Marshall . |
| 3,314,136 | 4/1967 | Giles . |
| 3,793,999 | 2/1974 | Seiler et al. . |
| 4,095,324 | 6/1978 | Lawson . |
| 4,304,035 | 12/1981 | Ecker . |
| 4,667,388 | 5/1987 | Browning . |
| 5,072,950 | 12/1991 | Littleproud et al. . |
| 5,207,196 | 5/1993 | Kuonen et al. . |
| 5,375,308 | 12/1994 | Harris . |

OTHER PUBLICATIONS

The Original Warshawsky & Co., J.C. Whitney & Co., *Everything Automotive Parts & Accessories*, Metro Catalog No. 119J—P.O. Box 8410, Chicago, IL 60680, "C–type Valve Lifter & Spring Compressor".

Newen—Spring Master brochure, The world's leading cylinder head disassembly / reassembly sytem, P.O. Box 910456, San Diego, CA 92191–0456.
*Goodson*—1997 Catalog, p. 47–48, Valve Guide Replacement, (Cylinder Head Rebuilding).
*Snap–on Anniversary*—75 Years—pp. E36 and E37, "Valves", 1997 Catalog.

*Primary Examiner*—David A. Scherbel
*Assistant Examiner*—Daniel G. Shanley
*Attorney, Agent, or Firm*—Richard G. Kinney

[57] ABSTRACT

A three piece tool for reassembly and disassembly of poppet valve spring assemblies which are set inside bores in engines. The tool includes a tubular part that closely fits the engine bore, slides down and around the spring assembly, and contacts the top of a washer of the spring assembly. Compression, using a C-clamp or like tool, forces the tubular member, and the washer, downward and allows the keepers to be removed from the valve stem. Release of the compression allows the spring assembly to be disassembled. Reassembly is accomplished using the tubular member with a liner and a plunger. With the keepers, springs and washer positioned, the tubular part, with a liner and plunger, is inserted into the bore and the tubular member pushed downward to compress the springs. The plunger serves to move the keepers into their operational position so that release of the force on the tube relocks the spring assembly into its operational position.

3 Claims, 4 Drawing Sheets

VALVE ASSEMBLY TOOL

FIELD OF THE INVENTION

The present invention relates to a new and improved tool for disassembly and assembly of stem poppet valves of the type having a spring, washer and keepers or locks for keeping these assembled parts together within a cylindrical bore in an engine cylinder head or like structure.

BACKGROUND OF THE INVENTION

It is necessary to disassemble and reassemble poppet valves in engine cylinder heads when rebuilding the engine and regrinding the valves and for other purposes such as replacing a broken or worn part. Many modern small engines have the spring assembly (spring/retainer washer/keeper and valve stem) recessed within a bore in the engine cylinder head. Recessed valve assemblies were designed to have less moving parts and to downsize engines. The cam rides directly above valves so there is no need for a rocker arm assembly or push rods. Lifters ride directly on top of the valve and the cams are seated oil top of the lifters. However, this compact arrangement makes it more difficult to disassemble and reassemble the valve for repair or replacement. U.S. Pat. No. 5,207,196 illustrates this type of compact engine cylinder head and one tool for inserting a preassembled valve unit when constructing the engine, as in the initial assembly of the engine at the factory.

While a number of tools have been proposed for use on earlier, more easily accessible valve stem assemblies (such as U.S. Pat. Nos. 5,375,308; 4,304,035; and 4,667,388) there exists a need for a simple tool that can allow the quick and easy disassembly, and aid in the more important and more difficult task of reassembly, of a bore-surrounded valve stem assembly at the repair shop without the need of using a preassembled total replacement unit.

SUMMARY OF THE INVENTION

The present invention provides a tool that can be used on such bore recessed valve spring assemblies to provide quick and relatively easy reassembly of the valve parts in the bore.

A tool constructed in accordance with the present invention includes a hollow cylindrical tube, sized to be received in a loose fit within the bore and having a bore at one end sized to receive the retainer or washer of the spring assembly and an internal ridge for engaging the washer's edge, a liner unit which, when inserted, is held in the tube by friction and serves to aid in keeping the keepers properly aligned and provides a base for receiving a plunger and a plunger that is loosely received in, but not attached to, the tube or the liner, which plunger, by gravity, pushes the keepers, or keys, downward into a proper locking engagement to the stem when the tube presses the washer downward around the stem during reassembly.

Thus the simple three major part tool of the invention allows both disassembly and reassembly of the valve spring assembly. It can be easily set up and works much faster than other such tools. The use of the tube extending into the bore aligns the tool and prevents misalignment and possible damage to the key or the washer during the reassembly operation and keeps the springs and retainer properly aligned with the valve stem, and the bore locks will drop in easily.

The invention, together with further advantages and features thereof, may best be understood by reference to the following description taken in connection with the accompanying drawings, in the several figures of which like reference numerals identify like elements.

DESCRIPTION OF THE PREFERRED EMBODIMENTS

Figure 1:
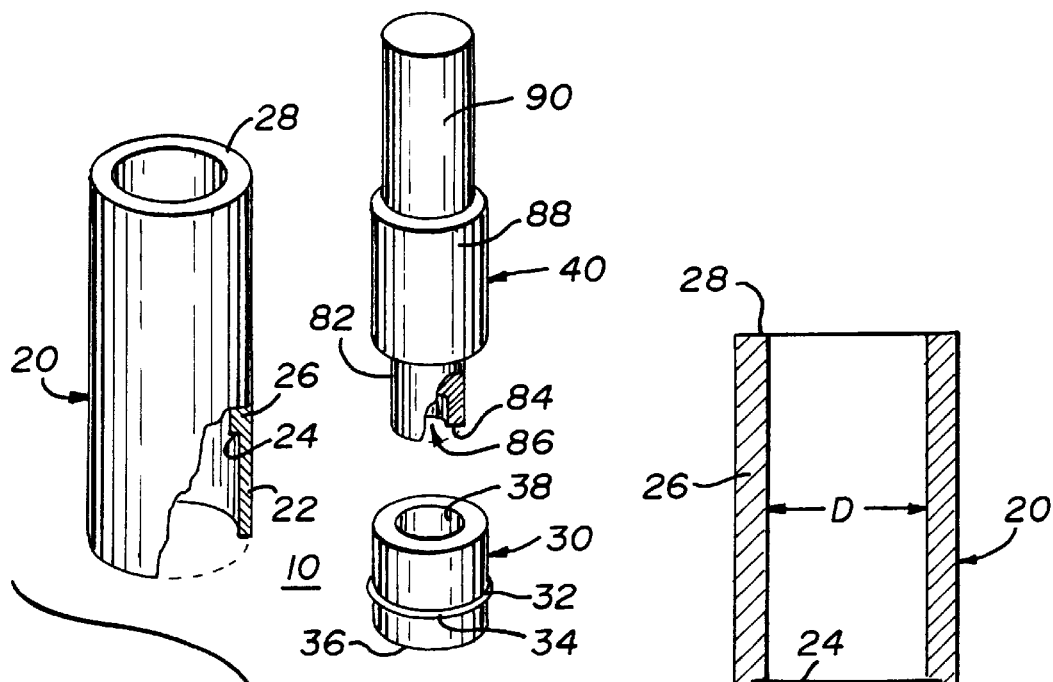
FIG. 1 is a perspective view, partly broken away to show internal construction of the three major parts that form the tool of the present invention.
Figure 2:
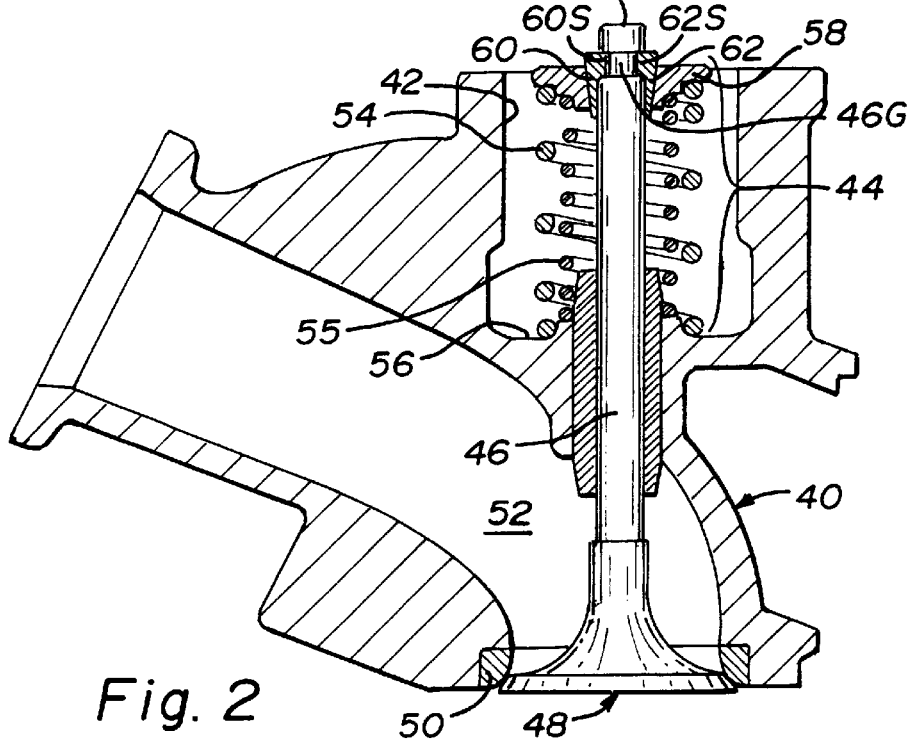
FIG. 2 is a sectional view of a portion of an engine cylinder head showing a poppet valve including an assembled spring assembly and part of the tool of FIG. 1 aligned for use in disassembling the spring assembly.
Figure 3:
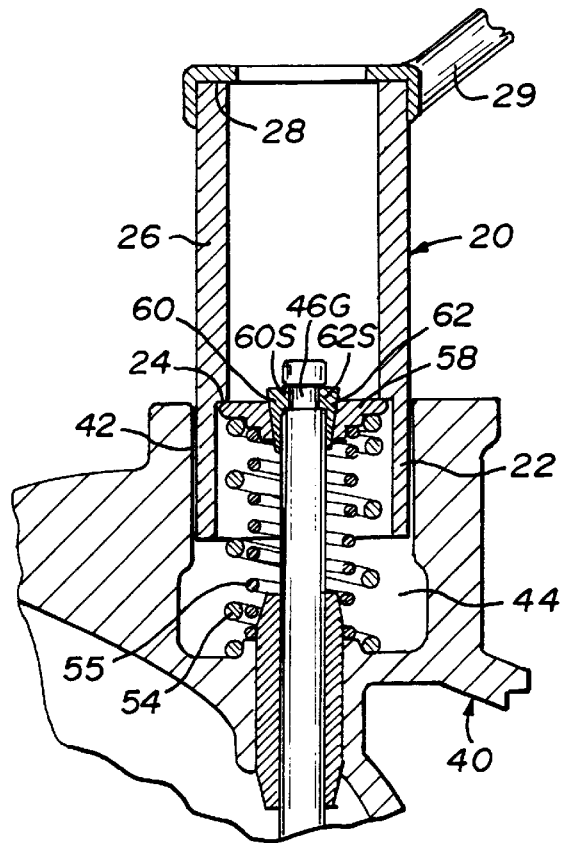
FIG. 3 is a sectional view similar to that of FIG. 1, but with the tool in a moved position.

Referring to the Figures, and initially to FIG. 1, there is illustrated a tool 10 constructed in accordance with the present invention. The tool 10 has three major parts, a tubular or hollow cylindrical tube 20, a liner 30, and a plunger 40. The tube 20 has, as better seen in FIG. 2, a thin wall lower portion 22 and an interior ridge or ledge 24 and a thicker wall section 26 thereabove. The tube 20 has a thick top edge 28 that may receive a fitting from a conventional C-type valve lifter and, as shown in FIG. 3, a spring compressor 29 (e.g. the one advertised at Page 188 of *The Original Warshawsky & Co./J C. Whitney & Co. Everything Automotive Parts & Accessories* catalog [Metro Catalog No. 119J]) or any equivalent means for compressing the springs of the valve spring assembly such as the assembly 44 shown in FIG. 2.

The tube 20 is constructed and dimensioned with reference to the valve spring assembly 44 and engine cylinder head to be worked on. A typical such cylinder head 40 is shown, in part, in FIG. 2 and can be seen to include a bore 42 which surrounds the valve spring assembly 44. This assembly 44 is releasably attached to a valve stem 46 which is part of a conventional valve 48. The poppet valve 48 seats against a seat 50 and serves to open and close the passageway 52. The valve assembly 44 includes a pair of helical coil compression springs 54, 55 which are positioned between the bottom 56 of the bore 42 and a retainer washer 58. The washer 58 serves to receive the tops of the springs 54, 55 and is secured to the valve stem 46 by a pair of keepers (also called keys or cotters or locks) 60, 62 which have interior shoulders or projections 62S, 60S which fit into a groove 46G formed about the side of the valve stem near its top 46T. The keepers 60, 62 are preferably made of a hardened steel that can be attracted by a magnet for ease in disassembly as illustrated below. As the construction of the valve, cylinder head and spring assembly may be entirely conventional, it will not be further detailed here. Reference may be had to the aforementioned patents, especially U.S. Pat. No. 5,307,196, for a more detailed description.

To disassemble the spring assembly 44, the springs 54 and 55 must be compressed, the washer 58 moved down the stem 46, and the keepers 60 and 62 freed from the groove 46G. The tube 20 alone, with any suitable compression or force applying means such as a C-type compressor 29 (FIG. 3), can be used to accomplish this end.

As mentioned before, the tube 20 is constructed with reference to the engine cylinder head 40 and assembly 44. That is, the outside diameter of the portion 22 is sized to loosely fit in the bore 42 and to use the bore to align the tube 20. The interior diameter d of the portion 22 is sized to loosely receive the washer 58 and the ledge 24 is sized to engage the upper outer lip of the washer 58 as shown in FIG. 3. The dimension D is selected so as to provide sufficient space to allow the keepers 60, 62 to fall outward and be easily removed by, for example, use of a magnetic screwdriver 70, as shown in FIG. 4.

Figure 4:
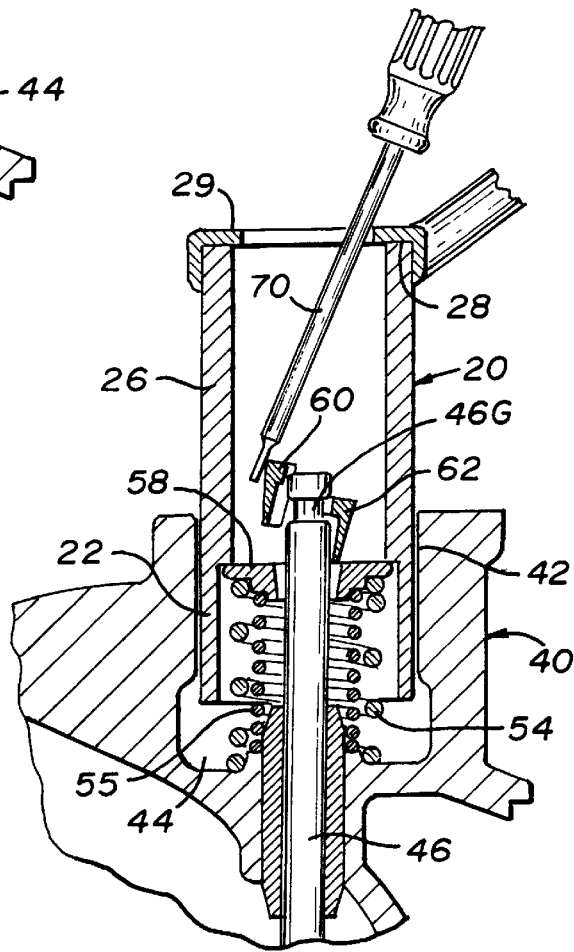
FIG. 4 is a view similar to that of FIG. 3, but with parts in a further moved position illustrating the disassembly of the valve spring assembly.

The tube 20 is used to disassemble the spring assembly by placing it as shown in FIG. 3 and compressing it downward (while supporting the valve stem) and latching it in the position as shown in FIG. 4. By lessening the compressing forces and raising the tool 29, the springs 54, 55 will expand and the washer and springs can be removed from the bore 42 and the valve 48 move downward (FIG. 2).

Figure 5:
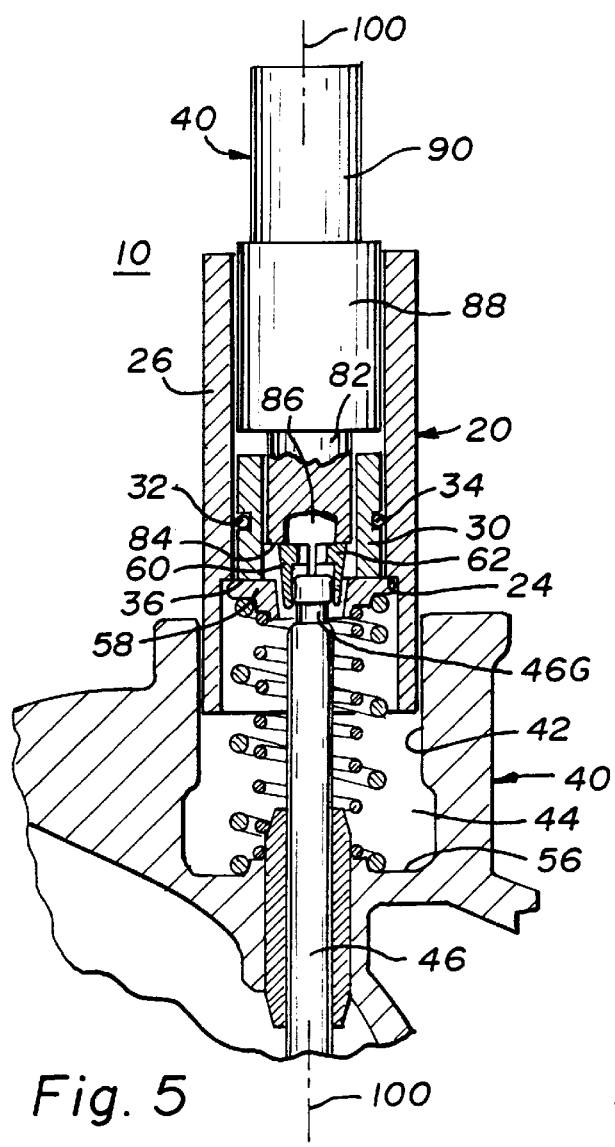
FIG. 5 is a largely sectional view showing the tool with its three major parts operationally assembled for use in assembling a spring valve unit and a spring valve unit positioned for the start of the reassembly operation.

Referring again to FIG. 1, the liner 30 is also tubular in shape and configuration and is provided with a central tubular passageway 38 and an exterior horizontal groove 32 in which an O-ring 34 is seated. As shown in FIG. 5, the liner 30 is sized to fit within the cylindrical section formed by the walls 26 and has a diameter slightly less than D. The O-ring projects outward from the groove and engages and is slightly compressed by the inside of the walls 26 so that the liner may be positioned and held by friction to the interior of the walls 26. In use, the liner 30 is positioned as shown in FIG. 5 with its circular bottom edge 36 at approximately the ridge or ledge 24. (In practice, the liner unit 30 can be positioned with its bottom edge 36 slightly below this ledge to begin with, as the washer 58 will shove it upward when compression forces are applied to tube 20 and the engine cylinder head and valve 48.)

Figure 6:
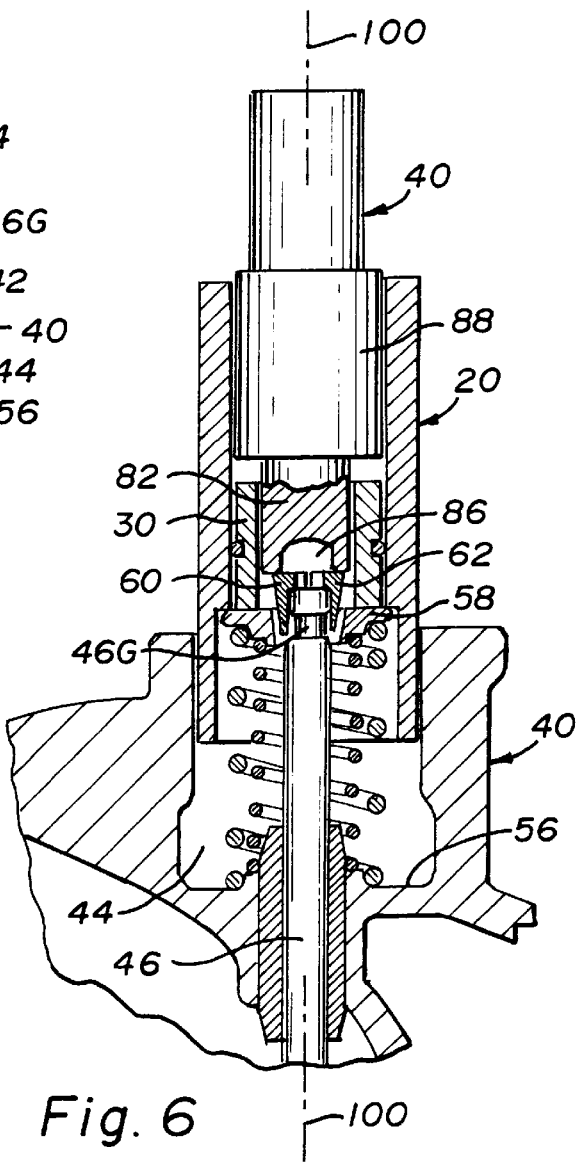
FIG. 6 is a view similar to that of FIG. 5, but with parts shown in a moved position and illustrating an intermediate stage of reassembly.
Figure 7:
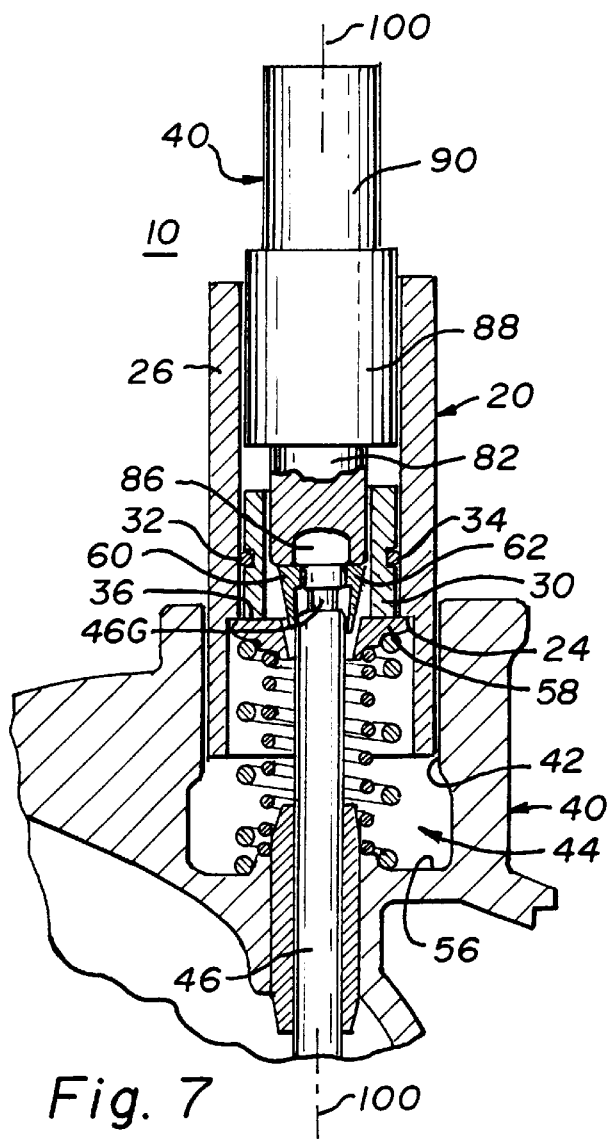
FIG. 7 is a view similar to that of FIG. 5 and FIG. 6, but with parts moved illustrating a later stage of reassembly.
Figure 8:
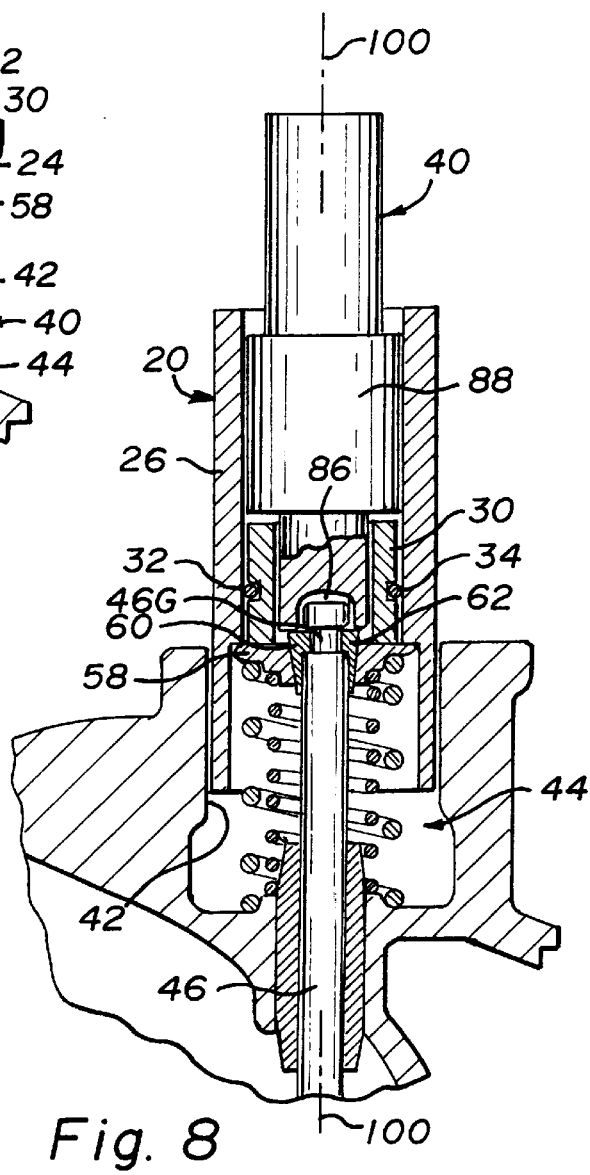
FIG. 8 is a view similar to that of FIG. 5, FIG. 6 and FIG. 7, but with parts in a moved position showing the reassembled spring assembly

The third major part of the tool 10 is the plunger 40. It is constructed with a central cylindrical section 88 sized to fit loosely within the tubular section 26 of the tube 20. A handle or gripping section 90 extends above this section and is sized so that it projects above the top 28 of the tube 20. The plunger 40 has a bottom section 82 sized to fit loosely within the central tubular passageway 38 of the liner 30 as shown in FIG. 5. This section 82 has a ring-shaped bottom surface 84 which surrounds a cavity 86 sized to receive the top 46T of the stem 46. The surface 84 bears down on the tops of the keeper, 60, 62 as shown in FIG. 6 and pushes them into the correct locking position (FIG. 8) by the force of gravity.

The parts 20, 30 and 40 of the tool 10 are all tubular shaped and round and when assembled (FIGS. 5–8) all have a common central axis 100 and when positioned in the bore 42, the axis 100 is the same as that of the central axis of the valve stem 46 and the bore 42. Thus, the part 20 serves to properly align the parts on the assembly 44 and prevents any misalignment and damage to the assembly 44 components or to the valve stem.

A prototype of the tool 10 was constructed for use with a conventional cylinder head assembly of the type shown in the drawings and will hereafter be described in detail for definiteness of disclosure. It being understood that other distinctions can be employed and for other sized cylinder head bores, different sized tools will be required.

The particular cylinder head for which the prototype was constructed has a valve stem diameter of approximately 0.312 inch, a bore 42 of a diameter of about 1.375 inches, a washer diameter of about 1.200 inches. The tool 10 had a tubular part 20 with an outside diameter of about 1.370 inches to closely, but slidably, fit within the bore 42. The inside diameter d of tubular portion 22 was about 1.210 inches to easily receive a washer 58 of slightly smaller diameter (about 1.2 inches). The diameter D of the upper portion of the tubular part 20 was about 1 inch so as to have the ledge 24 extend about 0.105 inch. The overall height of the tubular part was about 3 inches with the height of the 1.210 inch section being about one inch.

The liner had a height of 0.700 inch, an outside diameter of 0.980 inch, an interior diameter of 0.625 inch, and a groove with a dept of 0.740 inch, with a one inch diameter O-ring therein of a thickness sufficient to frictionally hold the liner in place within the section 26. The center portion 88 of the plunger 40 had a diameter of 0.980 inch, its top or handle portion 99, a diameter of 0.730 inch, and its lower portion 82, a diameter of 0.620 inch. The top or handle portion 99 was approximately 1 inch in height, the center portion 88 approximately 1.290 inches in height, and the bottom portion 82 approximately 0.700 inch in height, for an overall height of about 2.990 inches for the plunger 40. The cavity 86 had a diameter of about 0.342 inch, and a depth of about 0.240 inch. Of course, for other sized valve stems, engine bores and washer sizes, the tool 10 would be scaled up or down to match.

This prototype was tested and shown to operate quickly and safely in aiding a mechanic to disassemble or assemble valve spring assemblies.

To disassemble a valve spring assembly, the following instructions would apply:

(a) remove liner 30 from tube 20;

(b) place tube part 20 over valve spring assembly and into lifter bore 42;

(c) compress and releasably latch in the compressed state the valve spring assembly just far enough to remove the locks or keys 60, 62 from retainer washer 58. This leaves the adjustment of the spring compressor setting correctly for reassembly.

(d) Remove retainer locks 60, 62 through top of tube with magnetic torx screwdriver (FIG. 4) using a small torx bit, and using a twisting action to break loose from the valve stem.

To reassemble the valve spring assembly:

(a) Replace liner 30 into tube 20. The liner 30 serves to keep the keys 60, 62 upright when compressing the spring assembly.

(b) Place keys in retainer washer. Set over end of valve stem and spring.

(c) Place tube 20 over retainer washer 58, install plunger 40 in main body, compress, and release. Valve should now be assembled. If locks do not set, you may have to tighten the compressor slightly, or loosen it if they went too deep.

While particular embodiments of the invention have been shown and described, it will be obvious to those in the art that changes and modifications may be made without departing from the invention and, therefore, the aim in the appended claims is to cover all such changes and modifications as fall within the true spirit and scope of the invention.

I claim:

1. A tool for the disassembly and assembly of a poppet valve spring assembly of the type having a stem with a keeper-receiving groove, spring means, a retainer washer having a central hole, and keeper means that releasably locks into the groove to the stem to hold the retainer washer and spring means within and closely surrounded by the circular bore of a cylinder head, comprising:

a hollow cylindrical tube means having a lower end and outside diameter that may fit within the bore in a loose fit and an inside diameter from said lower end sized to receive in a loose fit the washer and means at a predetermined distance within said tube means for contacting the washer such that the tube means may be advanced around the washer of an assembled valve spring assembly and inserted into the bore of the cylinder head until the contacting means contacts the washer and by applying force to the cylinder tube means, the spring means may be compressed and the washer moves out of engagement with the keeper means, which may be then disengaged from the valve stem, so as to allow the washer, spring means and keeper means to be disassembled by raising the tube means;

a removable liner unit that fits within the tube means and is releasably held therein, said liner unit having means for confining keeper means to an upright position when the tube with the liner unit is used in the reassembly of the valve spring assembly with the spring initially uncompressed, the washer atop the uncompressed spring and keeper means inserted vertically in the washer opening and arranged to meet the stem; and a plunger unit sized to be received within said tube and within said liner, said plunger unit being free to move vertically under the force of gravity, said plunger being positioned to press against the vertically aligned keeper means within the hole of the washer so when the tube means is pressed or forced downward and the spring is compressed by the tube pressing against the washer, the plunger presses the keeper means downward and when the washer is pushed down sufficiently, allows the keeper means to snap into the groove in the valve stem such that the tool, when raised, leaves the valve spring assembly operationally assembled.

2. A tool for the assembly of a poppet valve spring assembly of the type having a stem with a keeper-receiving groove, spring means, a retainer washer having a central hole, and keeper means that releasably locks into the groove to the stem to hold the retainer washer and spring means within and closely surrounded by the circular bore of a cylinder head, comprising:

a hollow cylindrical tube means having a lower end and outside diameter that may fit within the bore in a loose fit and an inside diameter from said lower end sized to receive in a loose fit the washer and means at a predetermined distance within said tube means for contacting the washer such that the tube means may be advanced around the washer and inserted into the bore of the cylinder head;

said tube means having means for confining keeper means to an upright position when the tube with the liner unit is used in the assembly of the valve spring assembly with the spring initially uncompressed, the washer atop the uncompressed spring and keeper means inserted vertically in the washer opening and arranged to meet the stem; and a plunger unit sized to be received within said tube and within said liner, said plunger unit being free to move vertically under the force of gravity, said plunger being positioned to press against the vertically aligned keeper means within the hole of the washer so when the tube means is pressed or forced downward and the spring is compressed by the tube pressing against the washer, the plunger presses keeper means downward and when the washer is pushed down sufficiently, allows the keeper means to snap into the groove in the valve stem such that the tool, when raised, leaves the valve spring assembly operationally assembled.

3. In combination with a poppet valve spring assembly of the type having a stem with a keeper-receiving groove, spring means, a retainer washer having a central hole, and keeper means that releasably locks into the groove to the stem to hold the retainer washer and spring means within and closely surrounded by a circular bore defined in an engine, a tool comprising:

a hollow cylindrical tube means having a lower end and outside diameter that may fit within said bore in a loose fit and an inside diameter from said lower end sized to receive in a loose fit said washer and means at a predetermined distance within said tube means for contacting said washer such that the tube means may be advanced around the washer and inserted into said bore and aided in its alignment by said bore;

said tube means having means for confining keeper means to an upright position when the tube with the liner unit is used in the assembly of the valve spring assembly with the spring initially uncompressed, the washer atop the uncompressed spring and keeper means inserted vertically in the washer opening and arranged to meet the stem; and a plunger unit sized to be received within said tube and within said liner, said plunger unit being free to move vertically under the force of gravity, said plunger being positioned to press against the vertically aligned keeper means within the hole of the washer so when the tube means is forced downward and the spring is compressed by the tube pressing against the washer, the plunger presses said keeper means downward and when the washer is pushed down sufficiently, allows the keeper means to snap into the groove in the valve stem such that the tool, when raised, leaves the valve spring assembly operationally assembled.

* * * * *